R. A. SIMPSON.
BUTTER CUTTER.
APPLICATION FILED MAR. 27, 1917.
1,302,983.
Patented May 6, 1919.
2 SHEETS—SHEET 1.
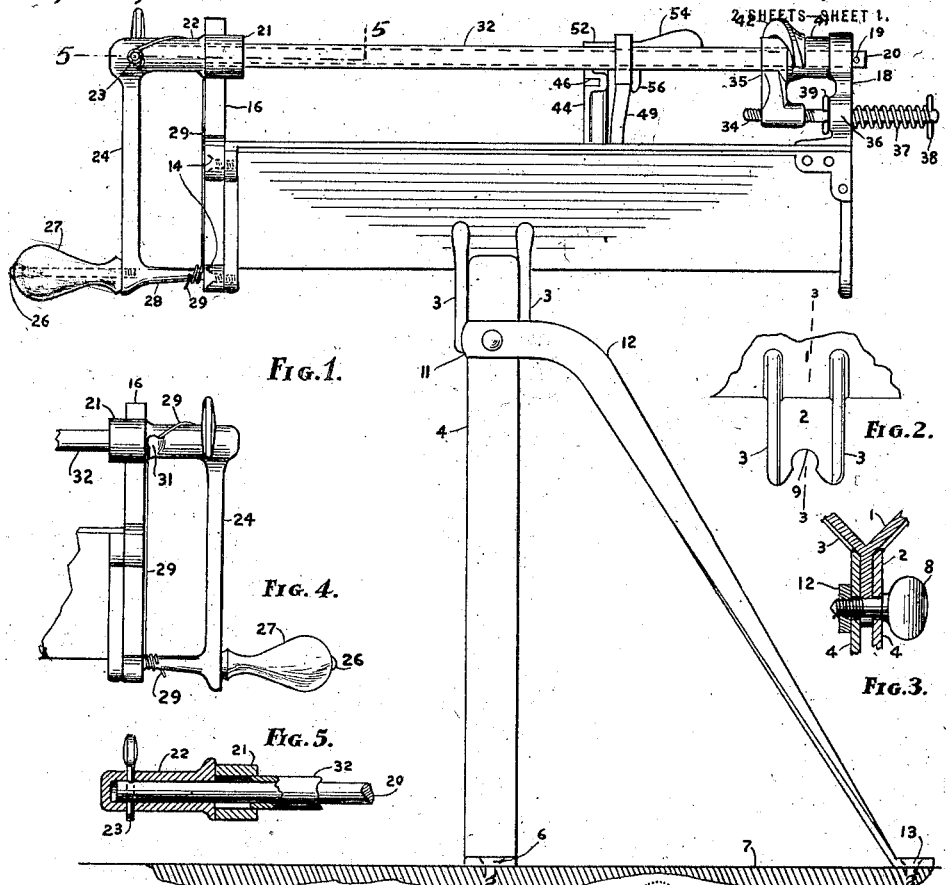
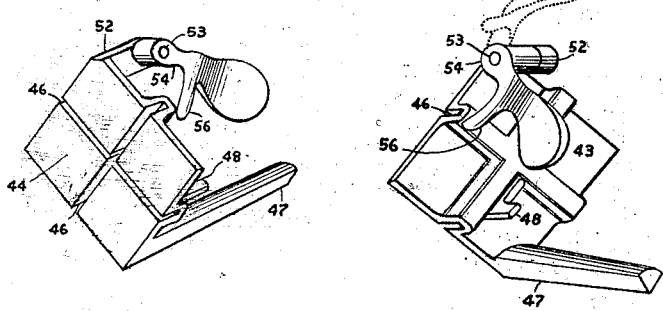
INVENTOR
RUFUS A. SIMPSON
By F. M. Wright
ATTORNEY R. A. SIMPSON.
BUTTER CUTTER.
APPLICATION FILED MAR. 27, 1917.
1,302,983.
Patented May 6, 1919.
2 SHEETS—SHEET 2.
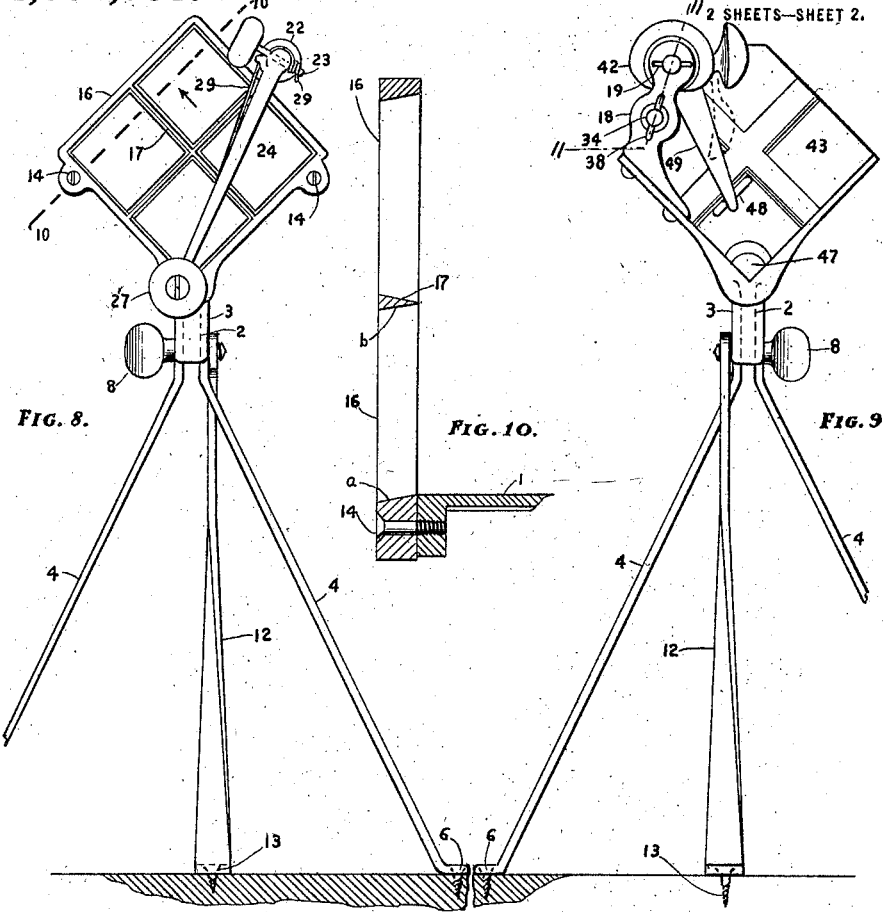
FIG. 8.   FIG. 10.   FIG. 9.
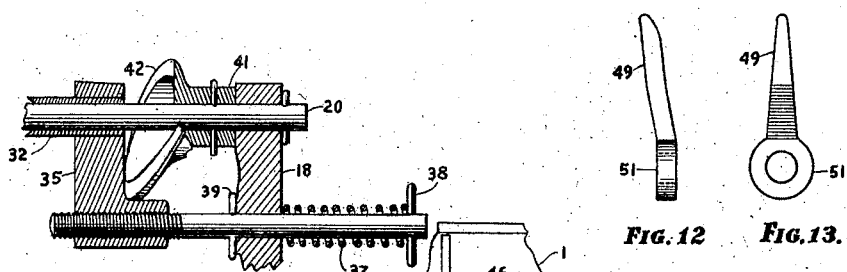
FIG. 11.   FIG. 12   FIG. 13.
FIG. 14.
INVENTOR
RUFUS A. SIMPSON
By *Jno. Wright*,
ATTORNEY

UNITED STATES PATENT OFFICE.

RUFUS A. SIMPSON, OF OAKLAND, CALIFORNIA.

BUTTER-CUTTER.

1,302,983.             Specification of Letters Patent.     Patented May 6, 1919.

Application filed March 27, 1917. Serial No. 157,596.

*To all whom it may concern:*

Be it known that I, RUFUS A. SIMPSON, a citizen of the United States, residing at Oakland, in the county of Alameda and State of California, have invented new and useful Improvements in Butter-Cutters, of which the following is a specification.

The present invention relates to improvements in cutters for butter and similar material which feed the material automatically with the cutting of the same. The object of the invention is to provide such a butter cutter in which there will be no tendency of the butter to re-unite after it has been cut into squares, which will be noiseless in operation, which can readily be adjusted to vary the thickness of the squares of butter which are cut thereby, of which the parts can easily be taken apart to be cleaned, which will contain simple and effective means for advancing the butter and for cutting off the squares of butter, and a support therefor which can be readily detached and packed in small compass.

In the accompanying drawings, Figure 1 is a side view of my improved butter cutter; Fig. 2 is a broken side view of a portion of the butter guide; Fig. 3 is a cross section on the line 3—3 of Fig. 2; Fig. 4 is a side view of the front end of the butter cutter observed from the side opposite to that in Fig. 1; Fig. 5 is a sectional view of the line 5—5 of Fig. 1; Fig. 6 is a perspective view of a follower looking from the front; Fig. 7 is a perspective view thereof looking from the rear; Fig. 8 is a broken end view of the butter cutter; Fig. 9 is a broken rear end view thereof; Fig. 10 is a sectional view on the line 10—10 of Fig. 8; Fig. 11 is an enlarged cross-sectional view on the line 11—11 of Fig. 9; Fig. 12 is a side view, and Fig. 13 is a front view, of a biting pawl; Fig. 14 is a broken plan view showing the mode of operation of the follower.

Referring to the drawing, 1 indicates a V-shaped trough, the sides of which are at right angles to each other. From the bottom of said trough depends a longitudinally extending integral web 2 having transverse flanges 3 at its vertical, or front and rear, edges so that it is I-shaped in cross section. Said web can be clamped between the upwardly extending and substantially parallel ends of two legs 4 extending obliquely in a transverse vertical plane, the lower ends of which are bent horizontally outward, and are apertured to permit them to be secured by screws 6 to a table 7 or other suitable support. A thumb screw 8 extends through holes in said upwardly extending ends, and, between said ends, extends also through a recess or notch 9 (see Fig. 2) in the lower end of said web and is screwed in a hole in a horizontally extending upper end 11 of leg 12 extending obliquely in a longitudinal vertical plane, the lower end of which leg 12 is bent outwardly and is apertured to permit it to be secured by a screw 13 to the table or other support. By screwing the thumb screw through said hole in the end 11 of the oblique leg 12, the upwardly extending ends of the two legs 4 are drawn together, thus clamping firmly between them the web 2, and, since each upwardly extending end fits snugly between the flanges 3 of the web 2, said trough is very firmly held on the tripod formed by said legs while, at the same time, it can be very quickly removed therefrom, and said legs can be folded up for convenience in transportation or storage.

Secured by screws 14 upon one end of the trough, is a square cutter frame 16, having cutter blades 17, which cross each other at right angles midway between the sides of the cutter frame and form with said sides four squares, through which the butter or other material is forced, thus cutting said material into four separate prisms or columns. Said cutter blades each taper from the front or outer edge to a sharp inner or cutting edge.

18 indicates a bracket or post riveted to the upper surface of one side of the trough, and secured in said bracket by a pin 19 in a bearing for a shaft 20, the front end of which extends through a bearing 21, formed integral with the cutter frame. On the front end of said shaft, and projecting in front of said bearing, is a sleeve 22, secured to said shaft by a tapering pin 23 passing through registering holes in said sleeve and shaft, and from said sleeve 22 extends a bow crank arm 24, from the outer end of which extends, parallel with said shaft, a stem 26 carrying a handle 27. To the rear end of the finger 28 of said bow crank 24 is secured an end of a fine cutting wire 29. Said wire is wound around said finger, and then extends to, and around, a lug 31 cast upon the rear end of the sleeve, and then in a helical direction around said sleeve, and then through a hole through the smaller end of the pin 23. The pin, being turned about its axis, causes the wire to be wound around it, and to be drawn taut between the finger 28 and the lug 31. The wire 29 serves to cut small blocks or squares from the prisms of butter after said prisms have been formed by being pressed against the cutter blades in the manner hereinafter described. The end of the tapering pin, being comparatively small, enables the degree of tautness of the wire to be varied as accurately as may be desired. The pin serves two purposes, to firmly secure the crank arm to the shaft 20, and to form an adjustable support for the end of the wire. The end of the wire, being secured to the end of the pin 23, also serves the purpose of retaining the pin in the registering holes in the sleeve 22 and shaft 20.

Surrounding the shaft 20 is a tube 32, the front end of which is contained within the bearing 21. The rear end of the tube is secured within one end of a pusher 35, in the other end of which is screwed an adjusting rod 34 which can slide through a bearing 36 in the post 18, and is pressed rearwardly through said bearing by a spring 37 around the rod 34, and compressed between the bearing 36 and a pin 38 extending transversely through the rear end of the rod. A pin 39, extending through the rod in front of said bearing 36, limits the rearward movement of the rod.

Secured around the shaft 20, between the pusher 35 and the post 18, is a short tube 41, which at its front end is expanded to form a cam 42, which bears against the rear side of the pusher 35. The edge of this cam 42 is smooth and continuous, or free from abrupt turns, so that its action is noiseless.

43 indicates a follower, having a substantially square front face 44 formed with transverse grooves 46 extending midway between its sides, and having also a rearwardly extending runner 47. Said runner moves in contact with the lowermost portions of the upper surfaces of the trough. It serves to add weight to the rear side of said follower and steady the same. Said follower is also formed with a rearwardly extending stud 48, the purpose of which is to form a stop upon which can rest the free end of a biting pawl 49, the other end of which loosely surrounds the tube 32, and, when the tube 32 moves forward, bites or grips said tube, so as to move forward with it, advancing the follower. The block of butter is thus advanced between the cutter blades, thereby also advancing the four prisms into which the butter is cut by said blades. While the cam is turning so that its highest portion no longer engages the rear edge of the pusher, and the forward movement of the follower and butter has ceased, the cutting wire is passing closely adjacent to the front surface of the cutter frame, cutting off the squares of butter. During this time the tube 32 is returning under the pressure of the coiled spring 37. The distance through which it returns depends upon the maximum distance through which the pin 39 travels in front of the bearing 36, and this can be varied by screwing the rod 34 into or out of the pusher 35. Upon the magnitude of the distance through which the tube returns depends the thickness of the squares of butter which are cut off.

When the tube returns, it does not return with it the biting pawl 49, but slides through the aperture therein, for the finger 56, engaging the rear side of the biting pawl close to the tube 32, prevents it from so returning.

The additional weight of the runner is of importance because the follower requires to be heavy to prevent it being carried back by the biting pawl 49 and also to prevent the biting pawl itself being carried back with the tube 32, the finger 56 on the arm 54 being provided for this latter object.

By the use of cutter blades having a sharp cutting edge the squares of butter or other material into which the material is cut are completely separated from each other, and do not tend to unite after passing said cutter frame. In this respect my invention is an improvement on prior butter cutters in which the block of butter is cut into squares or columns by means of fine wires. Said wires do not permanently spread the butter on opposite sides of the wire, but, on account of the small surface of the wire, the butter tends to creep back, when the wire has passed through it, and fill to a great degree the narrow empty space that has been created, and adhere together. When the cutting-off wire performs its function of slicing the prisms into small blocks or squares, it draws the butter into said empty space and this greatly increases the tendency of the particles of butter to adhere, so that it is necessary to separate them by hand, after being cut.

Moreover, said wires which are used to divide the butter into prisms or columns before cutting it into squares, however taut, yield to a certain degree, both longitudinally and transversely. When the cutting-off wire is moved transversely to the butter to cut it into squares, the cross wires give little assistance to the butter in resisting the transverse pressure of the cutting-off wire, tending to displace the butter. Consequently, when cross wires have been used, it has been proposed to employ a longitudinally extending bar piercing the mass of butter for the purpose of holding same in position while being cut. It is evident that with my improved cutting frame there is no necessity for using such a bar, as the blades of the cutting frame hold the butter very rigidly against the transverse pressure of the cutting-off wire, when being cut.

In my invention the blades spread the whole mass of butter, while the cross wires do not spread the same, but they only force the small portion of the butter contacting with the sides of the wires into the remainder of the mass of butter.

A further advantage of the cutting blades over wires is that they never need replacement owing to breakage, as do the wires.

It will be seen on reference to Fig. 10 that not only do the cutting blades 17 increase in thickness outward, but that the opposite faces $a$ of the lower portion of the cutting frame, adjacent to the side of the trough, slope outwardly, or downward, and are substantially parallel with the lower faces $b$ of the corresponding cutter blades 17. The result of this is to cause the lower prisms of butter to be deflected downward, as they pass through the cutter frame and therefore to be separated from the upper prism of butter. The upper edge of said cutter frame, which is not adjacent to a side of the trough, does not, however, diverge from the cutting blades as do the lower edges, but converges thereto. The object of this construction is to allow more room for the end of the block of butter to enter the space between the sides of the cutter frame and the blades. If the space between the cutter blades and the edges of the cutter frame were no wider on the side on which the butter enters the frame, than on the side on which it leaves it, there would be a danger of the cutting frame shearing off a thin slice of butter from the top of the block. By making these spaces of the same width as that of the lowermost space on the side on which the butter leaves the frame, but to a greater width on the side on which the butter enters the frame, this danger is avoided.

I am the first, as far as I am aware, to provide in a butter cutter of this type, a follower which is absolutely unattached to the trough or any other part of the butter cutter. The principal advantage of this construction is that the follower can be almost instantaneously removed for the purpose of washing and cleaning the same, and as quickly replaced.

It will also be noted how quickly the trough may be detached from the tripod for the same purpose. To do this it is only necessary to unscrew the screw 8 a turn or two, when the trough can be immediately lifted off.

I claim:—

1. In a butter cutter the combination of a trough having a depending integral web recessed in its bottom edge, two oblique legs having upper ends extending upwardly on opposite sides of said web, a third oblique leg extending in a direction to form a tripod with the other legs, and a device clamping together said web and the upper ends of said legs.

2. In a butter cutter the combination of a trough having a depending integral web recessed in its bottom edge, two oblique legs having upper ends extending upwardly on opposite sides of said web, a third oblique leg extending in a direction to form a tripod with the other legs, said legs having holes in their upper ends, and a clamping device extending through said holes and through a recess in the lower end of said web.

3. In a butter cutter the combination of a trough having a depending integral web flanged at its vertical edges, and recessed in its bottom edge, two oblique legs having upper ends extending upwardly on opposite sides of said web and fitting snugly between said flanges, a third oblique leg extending in a direction to form a tripod with the other legs, said legs having holes in their upper ends, and a clamping device extending through said holes.

4. In a butter cutter, a cutter frame having a cutter blade tapering in cross-section to a sharp cutting edge, dividing the interior of the frame into rectangular spaces, an inner surface of the edge of the frame on the side of one of said spaces opposite to the blade extending in a plane parallel with the adjacent side of the blade to permit the butter to pass through said space without being compressed between said edge and blade.

5. In combination with a trough or guide, a cutter frame at one end of said trough having a bearing, a shaft parallel with said trough and supported in said bearing, a sleeve on the front end of said shaft, a crank arm extending from said sleeve, a finger extending rearwardly from said crank arm, a wire of which one end is secured to the rear end of said finger, a lug on said sleeve to which said wire extends, said wire then extending around said sleeve, and a tapering pin in registering holes in the sleeve and shaft and to which the other end of the wire is attached.

6. The combination of a trough-shaped guide for butter, a device for intermittently advancing the butter in said guide, a pusher, one portion of which is secured to said device, an adjusting rod screwed into another portion of the pusher, a spring for pressing said adjusting rod rearwardly, and means for limiting the rearward movement of said rod.

7. The combination of a trough-shaped guide for butter, a shaft supported thereby, a tube around the shaft, means, operated by the tube, for advancing butter in said guide, a pusher, one portion of which is secured to the rear end of the tube, means for intermittently advancing the pusher, an adjusting rod screwed into another portion of the pusher, a spring for pressing said adjusting rod rearwardly, and means for limiting the rearward movement of said rod.

8. The combination of a trough-shaped guide, a shaft parallel with said guide, means carried by said guide having bearings for the ends of the shaft, a tube around the shaft, a pusher secured to the rear end of the tube, a cam secured around said shaft and engaging said pusher to advance the same, and a spring for pressing said pusher rearwardly.

9. The combination of a trough-shaped guide, a shaft parallel with said guide, means carried by said guide having bearings for the ends of the shaft, a tube around the shaft, a pusher secured to the rear end of the tube, a cam secured around said shaft and engaging said pusher to advance the same, a spring for pressing said pusher rearwardly, and means for limiting the rearward movement of said pusher.

10. The combination of a trough-shaped guide for butter, a shaft parallel with said guide, means carried by said guide having bearings for the ends of the shaft, a tube around the shaft, a pusher secured to the rear end of the tube, a cam secured around said shaft and engaging said pusher to advance the same, an adjusting rod screwed into the pusher, a spring for pressing said adjusting rod rearwardly, and means for limiting the rearward movement of said rod.

11. The combination of a butter guide, a shaft supported by said guide, a tube around the shaft, means whereby a reciprocating motion of the tube advances the butter, a pusher secured to the rear end of the tube, a cam secured around said shaft and engaging said pusher, its cam edge being free from abrupt changes in curvature.

12. In a butter cutter, a butter guide, and a follower therein having a runner extending rearwardly and closely adjacent to the lowermost portion of the guide.

13. In a butter cutter, a butter guide, a follower therein, a shaft, a tube slidable thereon, a biting pawl having a portion surrounding said tube, the outer end of said pawl engaging said follower, means for reciprocating said tube, and means whereby said pawl moves with said tube in one direction, but not in the other.

14. In a butter cutter, a butter guide, a follower therein, a longitudinally extending device, a biting pawl having a portion surrounding said device, the outer end of said biting pawl engaging said follower, means for reciprocating said device, and means whereby said biting pawl moves with said device in one direction, but not in the other.

15. In a butter cutter, a butter guide, a follower therein, a shaft, a tube slidable thereon, a biting pawl having a portion surrounding said tube, the outer end of said biting pawl engaging said follower, and means for reciprocating said tube, said follower having a rearwardly extending stud against which the outer end of the biting pawl engages in its operative position.

16. In a butter cutter, a butter guide, a follower therein, a longitudinally extending device, a biting pawl having a portion surrounding said device, the outer end of said biting pawl engaging said follower, and means for reciprocating said device, said follower having a rearwardly extending stud against which the outer end of the biting pawl engages in its operative position.

17. In a butter cutter, a butter guide, a follower therein, a shaft, a tube slidable thereon, a biting pawl having a portion surrounding said tube, the outer end of said biting pawl engaging said follower, means for reciprocating said tube, and an arm pivotally supported by said follower and holding the biting pawl to the follower.

18. In a butter cutter, a butter guide, a follower therein, a longitudinally extending device, a biting pawl having a portion surrounding said device, the outer end of said biting pawl engaging said follower, means for reciprocating said device, an arm pivotally supported by said follower and a finger extending from said arm and engaging said biting pawl.

19. In a butter cutter, a butter guide, a follower therein, a shaft, a tube slidable thereon, a biting pawl having a portion surrounding said tube, the outer end of said biting pawl engaging said follower, means for reciprocating said tube, and a weighted arm pivotally supported by said follower and holding the biting pawl to the follower.

20. In a butter cutter, a butter guide, a follower therein, a longitudinally extending device, a biting pawl having a portion surrounding said device, the outer end of said biting pawl engaging said follower, means for reciprocating said device, a weighted arm pivotally supported by said follower, and a finger extending from said arm and engaging said biting pawl.

21. In a butter cutter, a cutter guide and a follower therein wholly free from, or unattached to, any part of the butter cutter, and means for advancing the follower.

R. A. SIMPSON.